United States Patent

Wang et al.

(10) Patent No.: US 12,389,042 B2
(45) Date of Patent: Aug. 12, 2025

(54) PICTURES AND LAYERS INCLUDED IN A VVC IMAGE ITEM

(71) Applicant: Lemon Inc., Grand Cayman (KY)

(72) Inventors: Ye-Kui Wang, San Diego, CA (US); Li Zhang, San Diego, CA (US)

(73) Assignee: Lemon Inc.

( * ) Notice: Subject to any disclaimer, the term of this patent is extended or adjusted under 35 U.S.C. 154(b) by 0 days.

(21) Appl. No.: 17/464,364

(22) Filed: Sep. 1, 2021

(65) Prior Publication Data

US 2022/0070495 A1 Mar. 3, 2022

Related U.S. Application Data

(60) Provisional application No. 63/073,829, filed on Sep. 2, 2020.

(51) Int. Cl.
H04N 19/00 (2014.01)
H04N 19/107 (2014.01)
(Continued)

(52) U.S. Cl.
CPC .......... *H04N 19/70* (2014.11); *H04N 19/107* (2014.11); *H04N 19/159* (2014.11);
(Continued)

(58) Field of Classification Search
CPC ...................................................... H04N 19/00
See application file for complete search history.

(56) References Cited

U.S. PATENT DOCUMENTS 8,365,060 B2 1/2013 Wang et al.
9,357,199 B2 5/2016 Wang et al.
(Continued)

FOREIGN PATENT DOCUMENTS

CN 101313577 A 11/2008
CN 101981931 A 2/2011
(Continued)

OTHER PUBLICATIONS

"Information technology—High efficiency coding and media delivery in heterogeneous environments—Part 12: Image File Format—amendment 3; Support for VVC, EVC, Slideshow and other Improvement" IOS/IEC 23008-12:2017(E) Amendment 3; 202008239-Jul. 3, 2020; ( ISO/IEC JTC1/SC29/WG11) (Year: 2017).*
(Continued)

*Primary Examiner* — Maryam A Nasri
(74) *Attorney, Agent, or Firm* — Conley Rose, P.C.

(57) ABSTRACT

Systems, methods and apparatus for processing image data are described. One example method includes performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file includes a single access unit of the bitstream. The single access unit is either an Intra Random Access Picture (IRAP) access unit or a Gradual Decoding Refresh (GDR) access unit according to the video coding format. All pictures in the GDR access unit are identified as a recovery point in the bitstream.

20 Claims, 12 Drawing Sheets

(51) Int. Cl.
    *H04N 19/159* (2014.01)
    *H04N 19/176* (2014.01)
    *H04N 19/184* (2014.01)
    *H04N 19/517* (2014.01)
    *H04N 19/67* (2014.01)
    *H04N 19/70* (2014.01)

(52) U.S. Cl.
    CPC ......... *H04N 19/176* (2014.11); *H04N 19/184* (2014.11); *H04N 19/517* (2014.11); *H04N 19/67* (2014.11)

(56) References Cited

U.S. PATENT DOCUMENTS

| | | |
|---|---|---|
| 9,584,792 B2 | 2/2017 | Wang et al. |
| 9,648,299 B2 | 5/2017 | Wang et al. |
| 10,349,067 B2 | 7/2019 | Hendry et al. |
| 10,791,315 B2 | 9/2020 | Wang et al. |
| 10,873,736 B2 | 12/2020 | Wang et al. |
| 11,563,983 B2 | 1/2023 | Wang et al. |
| 11,595,672 B2 | 2/2023 | Wang et al. |
| 11,863,768 B2 | 1/2024 | Wang et al. |
| 2005/0062888 A1 | 3/2005 | Wood et al. |
| 2006/0265643 A1 | 11/2006 | Saft et al. |
| 2008/0001945 A1 | 1/2008 | Kashito et al. |
| 2009/0085918 A1 | 4/2009 | Hollingworth et al. |
| 2015/0110167 A1 | 4/2015 | Chen et al. |
| 2015/0264373 A1 | 9/2015 | Wang et al. |
| 2016/0073119 A1 | 3/2016 | Toma et al. |
| 2016/0132221 A1 | 5/2016 | Lasser et al. |
| 2016/0373771 A1 | 12/2016 | Hendry et al. |
| 2017/0237999 A1 | 8/2017 | Hendry et al. |
| 2018/0103199 A1 | 4/2018 | Hendry et al. |
| 2018/0103271 A1 | 4/2018 | Wang et al. |
| 2020/0336726 A1 | 10/2020 | Wang et al. |
| 2021/0392361 A1 | 12/2021 | Hendry et al. |
| 2022/0070480 A1 | 3/2022 | Wang et al. |
| 2022/0070496 A1 | 3/2022 | Wang et al. |
| 2022/0070497 A1 | 3/2022 | Wang et al. |
| 2023/0027058 A1 | 1/2023 | Hannuksela et al. |
| 2023/0059074 A1* | 2/2023 | Drugeon ............... H04N 19/70 |

FOREIGN PATENT DOCUMENTS

| | | |
|---|---|---|
| CN | 102428439 A | 4/2012 |
| CN | 104202661 A | 12/2014 |
| CN | 111182308 A | 5/2020 |
| JP | 2006079748 A | 3/2006 |
| JP | 2008530717 A | 8/2008 |
| JP | 2009512325 A | 3/2009 |
| JP | 2009182891 A | 8/2009 |
| JP | 2016540416 A | 12/2016 |
| JP | 2019506096 A | 2/2019 |
| TW | I687087 B | 3/2020 |
| WO | 2010058962 A2 | 5/2010 |
| WO | 2016057884 A1 | 4/2016 |
| WO | 2020130922 A1 | 6/2020 |

OTHER PUBLICATIONS

Hannuksela et al. "VVC Subpictures in ISO/IEC 14496-15" 129 MPEG Meeting, Jan. 13-17, 2020, Brussels, Motion Picture Expert Group or ISO/IEC JTC 1/SC 29/WG 11, No. m52209, Jan. 8, 2020, XP030224811, retrieved from the internet Jan. 8, 2020.

"Information Technology—High Efficiency Coding and Media Delivery in Heterogeneous Environments—Part 12: Image File Format," ISO/IEC 23008-12, ISO/IEC Standard, Nov. 30, 2017, pp. 1-72, XP009522782, retreived from the internet.

"Information Technology—High Efficiency Coding and Media Delivery in Heterogeneous Environments—Part 12: Image File Format—Amendment 3: Support for VVC, EVC, Slideshows and Other Improvements," Text of ISO/IEC 23008-12:2017 CDAM 3, 131 MPEG Meeting, Jun. 29, 2020 to Jul. 3, 2020, Motion Picture Expert Group or ISO-IEC JTC 1/SC 29/WG 11, No. n19460, Jul. 31, 2020, XP030288090, retrieved from the internet Jul. 31, 2020.

"Information Technology—Coding of Audio-Visual Objects—Part 15: Carriage Network Abstraction Later (NAL) Unit Structured Video in the ISO Base Media File Format," 128 MPEG Meeting, Oct. 7-11, 2019, Geneva, Motion Picture Expert Group or ISO/IEC JTC1/SC 29/WG 11, No. n18856, Oct. 11, 2019, XP030220847, retrieved from the internet Oct. 11, 2019.

"Technologies Under Consideration on ISO/IEC 23008-12," 128 MPEG Meeting, Oct. 7-11, 2019, Geneva, Motion Picture Expert Group or ISO8IEC JTC 1/SC 29/WG 11, No. n18819, Nov. 20, 2019, XP030225535, retrieved from the internet Nov. 20, 2019.

Wang et al. "On Slideshow Transition Properties," 132 MPEG Meeting, Oct. 12-16, 2020, Motion Picture Expert Group or ISO/IEC JTC 1/SC 29/WG 11, No. m55170, Oct. 5, 2020, XP030292687, retrieved from the internet Oct. 5, 2020.

Wang et al. "Comments on Image File Formats for VVC, EVC, and Slideshow," 132 MPEG Meeting Oct. 12-16, 2020, Motion Picture Expert Group or ISO/IEC JTC 1/SC 29/WG 11, No. m55174, Oct. 4, 2020, XP030292689, retrieved from the internet Oct. 4, 2020.

Extended European Search Report from European Patent Application No. 21194356.8 dated Jan. 28, 2022 (11 pages).

Extended European Search Report from European Patent Application No. 21194357.6 dated Jan. 28, 2022 (12 pages).

Extended European Search Report from European Patent Application No. 21194359.2 dated Jan. 28, 2022 (11 pages).

Extended European Search Report from European Patent Application No. 21194361.8 dated Feb. 2, 2022 (8 pages).

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.

Bross et al. ""Versatile Video Coding (Draft 10),"" Joint Video Experts Team (JVET)of ITU-T SG 16 WP 3 and ISO/IEC JTC 1/SC 29/WG 1119th Meeting: by teleconference, Jun. 22-Jul. 1, 2020, document JVET-S2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"Information Technology—Coding of Audio-Visual Objects—Part 15: Carriage of Network Abstraction Layer (NAL) Unit Structured Video in the ISO Base Media File Format—Amendment 2: Carriage of VVC and EVC in ISOBMFF" ISO/IEC 14496-15:2019(E) Amendment 2, ISO/IEC JTC 1/SC 29/WG 11, 2020, N19454.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

"Information Technology—Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.

"Information Technology—High Efficiency Coding and Media Delivery in Heterogeneous Environments—Part 12: Image File Format—Amendment 3: Support for VVC, EVC, Slideshows and Other Improvements," ISO/IEC 23008-12:2017(E) Amendment 3, ISO/IEC JTC1/SC 29/WG 11, 2020. N19460.

"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.

Examination Report from Indian Patent Application No. 202144039697 dated Mar. 24, 2022 (6 pages).

Non-Final Office Action from U.S. Appl. No. 17/464,251 dated May 13, 2022.

Non-Final Office Action from U.S. Appl. No. 17/464,415 dated Jun. 2, 2022.

Non-Final Office Action from U.S. Appl. No. 17/464,311 dated Jun. 15, 2022.

(56) References Cited

OTHER PUBLICATIONS

Bross et al. "Versatile Video Coding (Draft 10)," Joint Video Experts Team (JVET)of ITU-T SG 16 WP 3 and ISO/IEC JTC 1/SC 29/WG 1119th Meeting: by teleconference, Jun. 22-Jul. 1, 2020, document JVET-S0269, 2020. (cited in JP2021-142854 OA mailed Nov. 8, 2022).

"Information Technology—High Efficiency Coding and Media Delivery in Heterogeneous Environments—Part 12: Image File Format", ISO/IEC 23008-12, [online], Dec. 2017, <URL: https://standards.iso.org/ittf/PubliclyAvailableStandards/c066067_ISO_IEC_23008-12_2017.zip > (cited in JP2021-142853 OA mailed Nov. 1, 2022).

"Information Technology—High Efficiency Coding and Media Delivery in Heterogeneous Environments—Part 12: Image File Format", ISO/IEC 23008-12:2017(E), First edition, Dec. 2017, ISO/IEC, pp. 39-50. (cited in JP2021-142854 OA mailed Nov. 8, 2022).

"Information Technology—High Efficiency Coding and Media Delivery in Heterogeneous Environments—Part 2: High Efficiency Video Coding", ISO/IEC 23008-2:2020(E), Fourth edition, Aug. 2020, ISO/IEC, pp. 447-449. (cited in JP2021-142854 OA mailed Nov. 8, 2022).

Vadakital et al. "HEVC Still Image file format (MPEG-H Part 12)," ISO/IEC JTC1/SC29/WG11 Coding of Moving Pictures and Audio, MPEG 2013 W14148, Jan. 17, 2014. [online]<URL: https://mpeg.chiariglione.org/standards/mpeg-h/image-file-format/text-isoiec-cd-23008-12-image-file-format> (cited in JPJP2021-142852 OA mailed Nov. 1, 2022).

"3rd Generation Partnership Project; Technical Specification Group TS G SA; 5G Video Codec Characteristics (Release 17)", 3GPP TR26.955 3GPP Aug. 8, 2020, V0.3.0 (cited in JP2021-142853 OA mailed Nov. 1, 2022).

Final Office Action from U.S. Appl. No. 17/464,251 dated Oct. 24, 2022.

https://www.iso.org/obp/ui/#iso:std:iso-iec: 14496:-15:ed-6:v1:en, "VVC Terms and Definitions,".

Non-Final Office Action from U.S. Appl. No. 17/464,251 dated Apr. 27, 2023.

Aklouf et al. "Low Complexity Versatile Video Coding (VVC) for Low Bitrate Applications," 2019 8th European Workshop on Visual Information Processing (EUVIP), Jan. 2, 2020, pp. 22-27. (cited in CN 202111028428.3 NOA mailed Sep. 14, 2023).

Wang, Qiuyue. "Research on Technology of Inter-prediction and Rate-distortion Optimization in Video Coding," A Master Thesis Submitted to University of Electronic Science and Technology of China, Jul. 15, 2020., whole document. (cited in CN 202111028428.3 NOA mailed Sep. 14, 2023).

Zhang et al. "Video Composed of Image Sequence Using DES," Computer Technology and Development, Jun. 2010, 20(6):209-216, whole document. (cited in CN 202111028428.3 NOA mailed Sep. 14, 2023).

Okubo et al."H. 265 / HEVC textbook", the first edition, Impress Corporation Japan, Oct. 21, 2013, 93-95, 192nd-197 pages, ISBN: 978-4-8443-3468-2.

Notice of Reasons for Refusal from Japanese Patent Application No. 2023-135957 dated Jun. 11, 2024.

Notice of Reasons for Refusal for Japanese Application No. 2021-142855, mailed Oct. 8, 2024, 11 pages.

Feng Rui et al.; The Constrution of Learning Social Networking Sites in the Perspective Connectionism; Journal of Distance Education; Issue 3; Apr. 2013; p. 10-16 (English Abstract on p. 16).

Hannuksela M.M., et al., "VVC Subpictures in ISO/IEC 14496-15," ISO/IEC JTC 1/SC 29/WG 11, MPEG 2020/M52209, 129 MPEG Meeting, Brussels, BE, Jan. 13-17, 2020, 5 Pages, Retrieved on [Jan. 8, 2020].

Pre-Appeal Report from Japanese Patent Application No. 2023-135104 dated May 23, 2025, 13 pages.

Document: JVET-S2001-vG, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, 22 Jun.-Jul. 1, 2020, 544 pages.

\* cited by examiner

PICTURES AND LAYERS INCLUDED IN A VVC IMAGE ITEM

CROSS REFERENCE TO RELATED APPLICATIONS

Under the applicable patent law and/or rules pursuant to the Paris Convention, this application is made to timely claims the priority to and benefits of U.S. Provisional Patent Application No. 63/073,829, filed on Sep. 2, 2020. For all purposes under the law, the entire disclosure of the aforementioned application is incorporated by reference as part of the disclosure of this application.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a method for processing image data includes performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file includes a single access unit of the bitstream. The single access unit is either an Intra Random Access Picture (IRAP) access unit according to the video coding format or a Gradual Decoding Refresh (GDR) access unit according to the video coding format. All pictures in the GDR access unit are identified as a recovery point in the bitstream.

In another example aspect, a method for processing image data includes performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file excludes layers that do not belong to a target output layer set.

In another example aspect, a method for processing image data includes performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file includes at least part of an access unit in which a picture comprises one or more subpictures.

In another example aspect, a method for processing image data includes performing a conversion between a visual media file a bitstream. The visual media file comprises image items each comprising a sequence of one or more pictures according to a media file format. The bitstream includes access units each consisting of one or more pictures each belonging to a layer according to a video coding format. The media file format specifies that image items comprising pictures originated from the bitstream are allowed to be associated with different instances of a property descriptor that indicates high-level characteristics of the bitstream.

In another example aspect, a method for processing image data includes performing a conversion between a visual media file and a bitstream. The visual media file comprises image items each comprising a sequence of one or more pictures according to a media file format, and the bitstream includes access units each consisting of one or more pictures each belonging to a layer according to a video coding format. The media file format specifies that, in response to a record of operating points being included in a property descriptor of the operating points that indicates high-level characteristics of the bitstream, at least one of a value of a first syntax element in the record or a value of a second syntax element in the record is constrained to be a predetermined value.

In another example aspect, a video processing method is disclosed. The method includes performing a conversion between a visual media comprising a sequence of one or more images and a bitstream representation according to a file format; wherein the file format is configured to include one or more syntax element indicating a transition property between the one or more images during displaying of the one or more images.

In another example aspect, another video processing method is disclosed. The method includes performing a conversion between a visual media comprising a sequence of one or more images and a bitstream representation according to a file format; wherein the file format specifies that, in case that the visual media is represented in a file having a specific file brand, the file format is restricted according to a rule.

In another example aspect, another video processing method is disclosed. The method includes performing a conversion between a visual media comprising a sequence of one or more images and a bitstream representation according to a file format; wherein the file format is configured to indicate an image type for the one or more images according to a rule.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

In yet another example aspect, a computer readable medium having a bitstream stored thereon is disclosed. The bitstream is generated using a method described in the present document.

These, and other, features are described throughout the present document.

DETAILED DESCRIPTION

Figure 1:
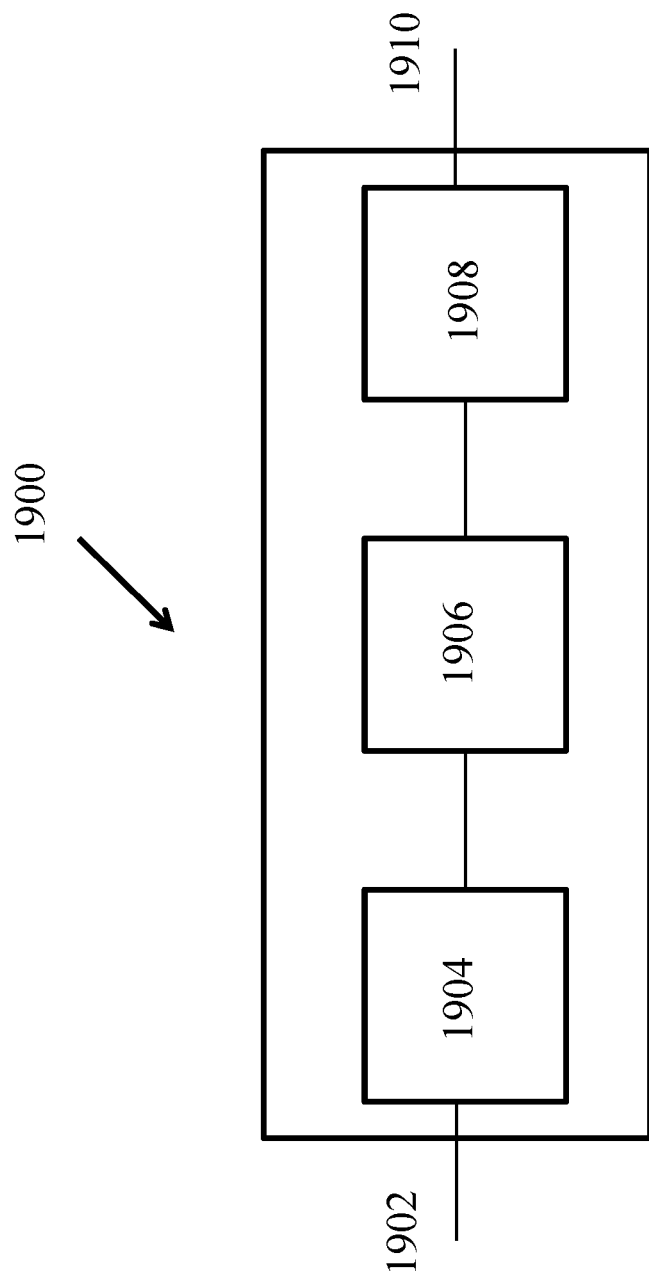
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification.

1. Overview

This document is related to image file format. Specifically, it is related to signalling and storage of images and image transitions in a media file based on the ISO base media file format. The ideas may be applied individually or in various combination, for images coded by any codec, e.g., the Versatile Video Coding (VVC) standard, and for any image file format, e.g., the VVC image file format being developed.

2. Abbreviations

AU Access Unit
AUD Access Unit Delimiter
AVC Advanced Video Coding
BP Buffering Period
CLVS Coded Layer Video Sequence
CLVSS Coded Layer Video Sequence Start
CPB Coded Picture Buffer
CRA Clean Random Access
CTU Coding Tree Unit
CVS Coded Video Sequence
DCI Decoding Capability Information
DPB Decoded Picture Buffer
DUI Decoding Unit Information
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
IRAP Intra Random Access Picture
JEM Joint Exploration Model
LTRP Long-Term Reference Picture
MCTS Motion-Constrained Tile Sets
NAL Network Abstraction Layer
OLS Output Layer Set
PH Picture Header
POC Picture Order Count
PPS Picture Parameter Set
PT Picture Timing
PTL Profile, Tier and Level
PU Picture Unit
RAP Random Access Point
RBSP Raw Byte Sequence Payload
SEI Supplemental Enhancement Information
SLI Subpicture Level Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion 3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format, can be needed.

3.3. VVC Video File Format

The VVC video file format, the file format for storage of VVC video content based on ISOBMFF, is currently being developed by MPEG.

3.4. VVC Image File Format and Image Transitions

The VVC image file format, the file format for storage of image content coded using VVC, based on ISOBMFF, is currently being developed by MPEG.

In some cases, a design for slideshow signaling is included, with the support of image transition effects such as wipe, zoom, fade, split, and dissolve. A transition effect is signalled in a transition effect property structure, which is associated with the first of the two consecutive items involved in the transition, indicates the transition type, and possibly signals other transition information, such as transition direction and transition shape, when applicable.

4. Examples of Technical Problems Solved by Disclosed Technical Solutions

The latest designs of VVC image file format and signalling of image transition effects have the following problems:
1) In slideshows or other types of image based applications that involve a transition effect from one image to another, although the time period for a transition often does not need to be precise, for a good user experience, it should not be too long, and it should not be too short, either. And the best transition period is content and transition type dependent. Therefore, it would be helpful from use experience point of view to signal a recommended transition period, where the recommended value is determined by the content creator.
2) In the latest VVC image file format draft specification, the specified VVC image item types and file brands allow the VVC bitstream of an image item to include an access unit containing multiple pictures of multiple layers, where some of pictures may be inter coded, i.e., containing predicted B or P slices using inter-layer prediction as specified in VVC. In other words, there lacks an interoperability point, either through an image item type or a file brand, wherein an image item can only contain one picture that is intra coded (i.e., containing only intra-coded I slices). In the VVC standard itself, such interoperability point has been provided through the definitions of the two still picture profiles, the Main 10 Still Picture profile and the Main 10 4:4:4 Still Picture profile.
3) An item of type 'vvc1' is specified as follows:
   An item of type 'vvc1' consists of the NAL units of a VVC bitstream that are length-delimited as specified below, and the bitstream contains exactly one access unit.
   NOTE 2 An item of type 'vvc1' may consists of an IRAP access unit as defined in ISO/IEC 23090-3, can contain more than one coded picture, and contains at most one coded picture with any specific value of nuh_layer_id.
   However, not any access unit can be the access unit in such an image item. Therefore, the first part of the above NOTE 2 should be moved to the basic definition (i.e., the first sentence quoted above), and the missing piece of GDR access unit should be added.
4) The following sentence exists:
   The 'vvc1' image item shall include the layers that are included in the layer set identified by the associated TargetOlsProperty and may include other layers too.
   If to allow for other layers than layers contained in the identified OLS, then which entity in the application system is supposed to set the right value of target OLS index in the associated TargetOlsProperty? Since in any case this value needs to be set correctly, e.g., by the file composer, throwing away the unnecessary pictures in the unnecessary layers would also be an easy operation by the file composer, so it would make sense to not allow unnecessary pictures in the unnecessary layers at all.
5) The following constraint exists:
   Image items originating from the same bitstream shall be associated with the same VvcOperatingPointsInformationProperty.
   However, a VVC bitstream may include multiple CVSs that may have different operating points.
6) In the following text, the values of some other syntax elements of VvcOperatingPointsRecord, such as ptl_max_temporal_id[i] (the temporal ID of the highest sub-layer representation for which the level information is present in the i-th profile_tier_level( ) syntax structure) and op_max_temporal_id, should also be constrained:
   When included in VvcOperatingPointsInformationProperty, the values of the syntax elements of VvcOperatingPointsRecord are constrained as follows:
   frame_rate_info_flag shall be equal to 0. Consequently, avgFrameRate and constantFrameRate are not present and their semantics are not specified.
   bit_rate_info_flag shall be equal to 0. Consequently, maxBitRate and avgBitRate are not present and their semantics are not specified.
7) The following text exists:
   If the VVC subpicture item is suitable to be decoded with a VVC decoder and to be consumed without other VVC subpicture items, the VVC subpicture item shall be stored as an item of type 'vvc1'.

Otherwise the VVC subpicture item shall be stored as an item of type 'vvs1' and formatted as a series of NAL units preceded by length fields, as defined in L.2.2.1.2.

Which has the following issues:
  a) This condition is not clear enough to be used as a condition for a conformance requirement (e.g., when thinking about how to check whether the requirement is fulfilled), and thus needs to be clarified.
  b) The use of image item of type 'vvc1' is not exactly aligned with the earlier definition that the bitstream contains exactly one VVC access unit, as herein the bitstream of an image item of type 'vvc1' can contain just a subset of a VVC access unit.
  c) It is not clear whether it is allowed to have one VVC image item, say of type 'vvc1', that contains a picture containing multiple "extractable" subpictures.

8) The following statement does not include OPI NAL units:

VPS, DCI, SPS, PPS, AUD, PH, EOS, and EOB NAL units shall be absent both in item and in the samples of 'vvs1' items.

However, the operating point information (OPI) NAL units should be handled similarly herein.

9) Only one transition effect (e.g., zoom, rotation) is allowed for a given image or a region within a given image. However, in real applications, multiple effects may be applied to one image or one region within a given image.

5. Example Embodiments and Solutions

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, a recommended transition period may be signalled for a transition from one image to another.
  a. In one example, alternatively, a mandatory transition period is signalled for a transition from one image to another.
  b. In one example, the value of the signalled value, a recommended or mandatory transition period, is determined by the content creator.
  c. In one example, one transition period is signalled for each transition property.
  d. In one example, one transition period is signalled for each type of transitions.
  e. In one example, one transition period is signalled for a list of transition properties.
  f. In one example, one transition period is signalled for a list of types of transitions.
  g. In one example, one transition period is signalled for all transitions.

2) To solve problem 2, one or more than one file brand is defined, such that the VVC bitstream contained in an image item conforming to such a brand is required to contain only one access unit that contains only one picture (or a part thereof) that is intra coded.
  a. Alternatively, one or more than one file brand is defined, such that the VVC bitstream contained in an image item conforming to such a brand is required to contain only one access unit that contains only one picture (or a part thereof) that is intra/IBC/Palette coded.
    i. Alternatively, one or more than one file brand is defined, such that the VVC bitstream contained in an image item conforming to such a brand is required to contain only one access unit that contains only one I picture (or a part thereof).
  b. In one example, the value of such a file brand is specified as 'vvic', 'vvi1', 'vvi2'.
  c. In one example, additionally, the VVC bitstream contained in such an image item is required to conform to the Main 10 Still Picture profile, the Main 10 4:4:4 Still Picture profile, the Main 10 profile, the Main 10 4:4:4 profile, the Multilayer Main 10 profile, or the Multilayer Main 10 4:4:4 profile.
    i. Alternatively, additionally, the VVC bitstream contained in such an image item is required to conform to the Main 10 Still Picture profile, the Main 10 4:4:4 Still Picture profile, the Main 10 profile, or the Main 10 4:4:4 profile.
    ii. Alternatively, additionally, the VVC bitstream contained in such an image item is required to conform to the Main 10 Still Picture profile or the Main 10 4:4:4 Still Picture profile.
  d. In one example, it may be specified that an image item conforming to such a brand shall not have any of the following properties: target output layer set property (TargetOlsProperty), VVC operating points information property (VvcOperatingPointsInformationProperty).

3) To solve problem 2, one or more than one image item type is defined, such that the VVC bitstream contained in an image item of such a type contains only one access unit that contains only picture that is intra coded.
  a. Alternatively, one or more than one image item type is defined, such that the VVC bitstream contained in an image item of such a type contains only one access unit that contains only picture that is intra/palette/IBC coded.
    i. Alternatively, one or more than one image item type is defined, such that the VVC bitstream contained in an image item of such a type contains only one access unit that contains only I pictures.
  b. In one example, the type value of such an image item type is specified as 'vvc1' or 'vvc2'.
  c. In one example, additionally, the bitstream in such an image item is required to conform to the Main 10 Still Picture profile, the Main 10 4:4:4 Still Picture profile, the Main 10 profile, the Main 10 4:4:4 profile, the Multilayer Main 10 profile, or the Multilayer Main 10 4:4:4 profile.
    i. Alternatively, additionally, the bitstream in such an image item is required to conform to the Main 10 Still Picture profile, the Main 10 4:4:4 Still Picture profile, the Main 10 profile, or the Main 10 4:4:4 profile.
    ii. Alternatively, additionally, the bitstream in such an image item is required to conform to the Main 10 Still Picture profile or the Main 10 4:4:4 Still Picture profile.
  d. In one example, it may be specified that an image item of such a type shall not have any of the following properties: target output layer set property (TargetOlsProperty), VVC operating points information property (VvcOperatingPointsInformationProperty).

4) To solve problem 3, a VVC image item, e.g., of type 'vvc1', is defined to consist of the NAL units of a VVC bitstream that contains exactly one access unit that is an IRAP access unit as defined in ISO/IEC 23090-3 or an GDR access unit for which all pictures have ph_recovery_poc_cnt equal to 0 as defined in ISO/IEC 23090-3.

5) To solve problem 4, it is disallowed for a VVC image item, e.g., of type 'vvc1', to contain pictures in layers that do not belong to the target output layer set.

6) To solve problem 5, it is allowed for image items originating from the same bitstream to be associated with different instances of VvcOperatingPointsInformationProperty.

7) To solve problem 6, the syntax element ptl_max_temporal_id[i] and op_max_temporal_id of VvcOperatingPointsRecord are constrained to be certain values when VvcOperatingPointsRecord is included in VvcOperatingPointsInformationProperty.

8) To solve problem 7, it may be specified that either of the following is allowed for a VVC image item, e.g., of type 'vvc1':
   a. Contains an entire VVC access unit, wherein each picture may contain multiple "extractable" subpictures.
   b. Contains a subset of a VVC access unit, wherein for each layer present in the bitstream, there is one or more "extractable" subpictures that collectively form a rectangular region.
   Where an "extractable" subpicture refers to a subpicture for which the corresponding flag sps_subpic_treated_as_pic_flag[i] as specified in VVC is equal to 1.

9) To solve problem 8, it may be specified that OPI NAL units shall be absent both in item and in the samples of 'vvs1' items.

10) To solve problem 9, it is proposed to allow multiple transition effects from one image (or a region thereof) to another image (or a region thereof) in a slideshow.
    a. In one example, indications of multiple transition effects may be signaled, e.g., by having multiple transition effect property structures associated with the first of two consecutive image items.
    b. In one example, an indication of the number of transition effects to be applied to two consecutive image items may be signaled in the file.
    c. Alternatively, furthermore, how to apply the multiple transition effects may be signaled in the file or predefined or derived-on-the-fly.
       i. In one example, the order for applying the multiple transition effects may be signaled in the file.
       ii. In one example, the order for applying the multiple transition effects may be derived according to the order of indications of the multiple effects in the bitstream.

11) To solve problem 9, it is proposed to allow multiple transition effects from one image to another image in a slideshow, wherein each of the multiple transition effects applies to a particular region in the two image items involved in the transition.
    a. In one example, the particular region in the two image items involved in the transition to which the transition effect applies is signaled in the transition effect property.

12) To solve problem 9, it is proposed to allow multiple alternative transition effects to be signalled for a pair of consecutive image items, and it is up to the player of the file to choose one of the multiple transition effects to be applied.
    a. In one example, the priority order (or preference order) of the multiple transition effects is signaled in the file or predefined or derived according to the order of the signalling of the transition properties.

6. Embodiments

Below are some example embodiments for some of the invention aspects summarized above in Section 5, which can be applied to the standard specification for VVC image file format and support of slideshows. Most relevant parts that have been added or modified are underlined in boldface italics, and some of the deleted parts are indicated using [[ ]].

6.1. First Embodiment

This embodiment is for at least items 1, 1.b, and 1.c.
6.5.28 Wipe Transition Effect
6.5.28.1 Definition
    Box type: ' wipe'
    Property type: Transformative item property
    Container: ItemPropertyContainerBox
    Mandatory (per item): No
    Quantity (per item): At most one
    The WipeTransitionEffectProperty documents the suggested wipe transition effect (an image item gradually replaces another from one side of the image item to another) to apply between the display of two consecutive items of a Slideshow entity group.
    This item property shall be associated with the first of the two consecutive items involved in the transition.
    This item property shall be associated with an image item after the association of any other descriptive or transformative properties.
6.5.28.2 Syntax
    aligned(8) class WipeTransitionEffectProperty
    extends ItemFullProperty('wipe', version=0, flags=0) {
        unsigned int(8) transition_direction;
        unsigned int(8) transition_period;
    }
6.5.28.3 Semantics
    transition_direction identifies the transition direction to apply. It takes one of the following values:
        0: from-left;
        1: from-right;
        2: from-top;
        3: from-bottom;
        4: from-left-top;
        5: from-right-top;
        6: from-left-bottom;
        7: from-right-bottom;
        Other values are-reserved.
    transition_period indicates the recommended transition period, in units of seconds, i.e., the time period from the start to the end of the transition. The value equal to 0 indicates that no transition period is recommended.
6.5.29 Zoom Transition Effect
6.5.29.1 Definition
    Box type: ' zoom'
    Property type: Transformative item property
    Container: ItemPropertyContainerBox
    Mandatory (per item): No
    Quantity (per item): At most one The ZoomTransitionEffectProperty documents the suggested zoom transition effect (an image item replaces another by zoom-in or zoom-out from another image item) to apply between the display of two consecutive items of a Slideshow entity group.

This item property shall be associated with the first of the two consecutive items involved in the transition.

This item property shall be associated with an image item after the association of any other descriptive or transformative properties.

6.5.29.2 Syntax

```
aligned(8) class ZoomTransitionEffectProperty
extends ItemFullProperty('zoom', version=0, flags=0) {
    unsigned int(1) transition_direction;
    unsigned int(7) transition_shape;
    unsigned int(8) transition_period;
}
```

6.5.29.3 Semantics transition_direction identifies the transition direction to apply. It takes one of the following values:
- 0: in; (zoom-in using the shape defined by transition_shape)
- 1: out; (zoom-out using the shape defined by transition_shape)

transition_shape identifies the transition shape to apply. It takes one of the following values
- 0: rectangular;
- 1: circle;
- 2: diamond;
- Other values are reserved.

transition_period indicates the recommended transition period, in units of seconds, i.e., the time period from the start to the end of the transition. The value equal to 0 indicates that no transition period is recommended.

6.5.30 Fade Transition Effect 6.5.30.1 Definition

Box type: ' fade'
Property type: Transformative item property
Container: ItemPropertyContainerBox
Mandatory (per item): No
Quantity (per item): At most one The FadeTransitionEffectProperty documents the suggested fade transition effect (an image item replaces another by first gradually transitioning to a white or black image and then gradually transitioning from this white or black image to the new image item) to apply between the display of two consecutive items of a Slideshow entity group.

This item property shall be associated with the first of the two consecutive items.

This item property shall be associated with an image item after the association of any other descriptive or transformative properties.

6.5.30.2 Syntax

```
aligned(8) class FadeTransitionEffectProperty
extends ItemFullProperty('fade', version=0, flags=0) {
    unsigned int(8) transition_direction;
    unsigned int(8) transition_period;
}
```

6.5.30.3 Semantics transition_direction identifies the transitioning image to use. It takes one of the following values:
- 0: through_white;
- 1: through_black;
- Other values are reserved.

transition_period indicates the recommended transition period, in units of seconds, i.e., the time period from the start to the end of the transition. The value equal to 0 indicates that no transition period is recommended.

6.5.31 Split Transition Effect 6.5.31.1 Definition

Boxtype: 'split'
Property type: Transformative item property
Container: ItemPropertyContainerBox
Mandatory (per item): No
Quantity (per item): At most one The SplitTransitionEffectProperty documents the suggested split transition effect (an image item gradually replaces another image item by first being horizontally or vertically split) to apply between the display of two consecutive items of a Slideshow entity group.

This item property shall be associated with the first of the two consecutive items.

This item property shall be associated with an image item after the association of any other descriptive or transformative properties.

6.5.31.2 Syntax

```
aligned(8) class SplitTransitionEffectProperty
extends ItemFullProperty('split', version=0, flags=0) {
    unsigned int(8) transition_direction;
    unsigned int(8) transition_period;
}
```

6.5.31.3 Semantics transition_direction identifies the transitioning direction to apply. It takes one of the following values:
- 0: vertical_in;
- 1: vertical_out;
- 2: horizontal_in;
- 3: horizontal_out;
- Other values are reserved.

transition_period indicates the recommended transition period, in units of seconds, i.e., the time period from the start to the end of the transition. The value equal to 0 indicates that no transition period is recommended.

6.5.32 Dissolve Transition Effect 6.5.32.1 Definition

Box type: ' dsvl'
Property type: Transformative item property
Container: ItemPropertyContainerBox
Mandatory (per item): No
Quantity (per item): At most one The DissolveTransitionEffectProperty documents the suggested dissolve transition effect (an image item replaces another by gradually fading in while the other image item is gradually fading out) to apply between the display of two consecutive items of a Slideshow entity group.

This item property shall be associated with the first of the two consecutive items.

This item property shall be associated with an image item after the association of any other descriptive or transformative properties.

6.5.32.2 Syntax

```
aligned(8) class DissolveTransitionEffectProperty
extends ItemFullProperty('dsvl', version=0, flags=0) {
    unsigned int (8) transition_period;
}
```

6.5.32.3 Semantics transition_period indicates the recommended transition period, in units of seconds, i.e., the time period from the start to the end of the transition. The value equal to 0 indicates that no transition period is recommended.

6.8
Add the following new subclause after subclause 6.8.8:
6.5.33 Slideshow
6.8.9.1 ' Slid' Entity Group The Slideshow entity group ('slid') indicates a set of entities that are intended to form a slideshow. This entity group shall contain entity_id values that point to image items and shall contain no entity_id values that point to tracks.

NOTE 1 An input image item may be a derived item (e.g. identity, overlay or grid) for advanced slideshows requiring composition of images (possibly onto a canvas).

The entity_id values of the input slideshow images in a Slideshow entity group shall be listed in increasing display order.

There may be multiple Slideshow entity groups in the same file with different group_id values.

A transition effect item property may be associated with an image item of the Slideshow entity group to document the transition effect to apply between this image item and the consecutive image item in the list of entities.

NOTE 2 When a same image needs to be included in different slideshows, it is possible to associate it with a different transition effect in a different slideshow either by using a derived item of type 'iden' in a different slideshow associated with a different transition effect or by having two items that share same data (via 'iloc') but having a different transition effect in different slideshows.

NOTE 3 Transition effect item properties should only be marked as essential if they truly are so, as an unrecognized transition property that is marked as essential might impede displaying of a single image. In most slideshows the transition effects are 'nice to have' but they should not prevent displaying an image if the reader doesn't understand the transition effect.

6.2. Second Embodiment

This embodiment is at least for items 4 and 5.
L.2.2.1.2 Image Item of Type ' Vvc1'

An item of type ' vvc1' consists of the NAL units of a VVC bitstream that are length-delimited as specified below, and the bitstream contains exactly one access unit that is an IRAP access unit as defined in ISO/IEC 23090-3 or an GDR access unit for which all pictures have ph recovery poc cnt equal to 0 as defined in ISO/IEC 23090-3.

NAL units with nuh_layer_id greater than 0 may be present in items of type 'vvc1'. Readers shall process NAL units with nuh_layer_id greater than 0 in an item of type 'vvc1' in a similar manner as NAL units with nuh_layer_id equal to 0.

NOTE 1 In an image item of type 'vvc1', pictures in non-independent layers may use inter-layer prediction and hence may contain inter coded slices. A picture that does not use inter-layer prediction in an image item may be an IDR or CRA picture or a GDR picture with ph_recovery_poc_cnt equal to 0 as defined ISO/IEC 23090-3.

NOTE 2 An item of type 'vvc1' [[may consists of an IRAP access unit as defined in ISO/IEC 23090-3, can contain more than one coded picture, and]] contains at most one coded picture with any specific value of nuh_layer_id.

All image items of type 'vvc1' with multiple layers shall have an associated item property VvcOperatingPointsInformationProperty. The VvcOperatingPointsInformationProperty provides a summary of the high-level characteristics of the bitstream contained in the image item with multiple layers, similar to the 'vopi' sample grouping of ISO/IEC 14496-15.

All image items of type 'vvc1' shall have zero or one associated item property TargetOlsProperty. The TargetOlsProperty contains the target_ols_idx, which provides the output layer set index to be used as input for the decoding process of VVC coded image item. The target_ols_idx is used as the value of the TargetOlsIdx variable and is specified in the same coding format as in VVC. The number of TargetOlsProperty shall not be zero unless there is only one picture in the image item. The 'vvc1' image item shall include the layers that are included in the output layer set identified by the associated TargetOlsProperty and [[may include other layers too]] shall not include other layers.

An image item of type 'vvc1' may have an associated item property LayerSelectorProperty. The LayerSelectorProperty shall contain layer_id that is among the nuh_layer_id values of the output layers of the output layer set identified by TargetOlsProperty associated with the same image item.

6.3. Third Embodiment

This embodiment is at least for items 6 and 7.
L.2.3.3 VVC Operating Points Information Property
L.2.3.3.1 Definition
Box type: ' vopi'
Property type: Descriptive item property
Container: ItemPropertyContainerBox
Mandatory (per item): No, for an image item of type 'vvc1'
Quantity (per item): Zero or one for an image item of type 'vvc1'

The VvcOperatingPointsInformationProperty is similar to the VvcOperatingPointsInformation specified in ISO/IEC 14496-15 but applies to image items.

[[Image items originating from the same bitstream shall be associated with the same VvcOperatingPointsInformationProperty.]] The VvcOperatingPointsInformationProperty informs about the different operating points provided by a bitstream and their constitution. Each operating point is related to an output layer set and a combination of a profile, tier and level. TargetOlsProperty associated with an image item provides the output layer set index that can be used to select which operating-point-specific information of the VvcOperatingPointsInformationProperty applies to the image item. The VvcOperatingPointsInformationProperty also provides the dependency information between layers.

L.2.3.3.2 Syntax
```
aligned(8) class VvcOperatingPointsInformationProperty
extends ItemFullProperty('vopi', version=0, flags=0){
    VvcOperatingPointsRecord; //specified in ISO/IEC 14496-15
}
```
L.2.3.3.3 Semantics The semantics of VvcOperatingPointsRecord are specified in ISO/IEC 14496-15. When included in VvcOperatingPointsInformationProperty, the values of the syntax elements of VvcOperatingPointsRecord are constrained as follows:

ptl_max_temporal_id[i] for each value of i in the range of 0 to num_profile_tier_level_minus1, inclusive, shall be equal to 0.

max_temporal_id shall be equal to 0.

frame_rate_info_flag shall be equal to 0. Consequently, avgFrameRate and constantFrameRate are not present and their semantics are not specified.

bit_rate_info_flag shall be equal to 0. Consequently, maxBitRate and avgBitRate are not present and their semantics are not specified.

6.4. Fourth Embodiment

This embodiment is at least for item 9.

VVC Subpicture Items

ISO/IEC 23090-3 allows partitioning of a picture into subpictures. ISO/IEC 23090-3 includes the exact definition and the signalling of the properties of a subpicture, while some properties are informatively repeated in the following:

A subpicture is a rectangular region of a picture with one or more slices.

A subpicture may be decoded independently of other subpictures, if [[there are no intra prediction, entropy decoding and loop filter dependencies between subpictures]] the subpicture boundaries are treated as picture boundaries in the inter prediction process (i.e., when the corresponding flag sps subpic treated as pic flag[i] as specified in ISO/IEC23090-3 is equal to 1).

If the VVC subpicture item is suitable to be decoded with a VVC decoder and to be consumed without other VVC subpicture items, the VVC subpicture item shall be stored as an item of type 'vvc1'.

Otherwise the VVC subpicture item shall be stored as an item of type 'vvs1' and formatted as a series of NAL units preceded by length fields, as defined in L.2.2.1.2.

A subpicture item stored as type 'vvc1' shall follow all the requirements of subclause L.2.2.1.2. When the VVC subpicture item is stored as an item of type 'vvs1', the following constraints apply for the item:

A set of VCL NAL units containing one or more subpictures, as defined in ISO/IEC 23090-3, such that the subpictures contained in the set of VCL NAL units represent a rectangular array of pixels;

VPS, DCI, OPI, SPS, PPS, AUD, PH, EOS, and EOB NAL units shall be absent both in item and in the samples of 'vvs1' items.

The item shall be associated with a 'vvnC' item property with the syntax and semantics identical to VvcNALU-ConfigBox as specified in ISO/IEC 14496-15.

NOTE NAL units with nuh_layer_id greater than 0 may be present in items of type 'vvs1'. Readers shall process NAL units with nuh_layer_id greater than 0 in an item of type 'vvs1' in a similar manner as NAL units with nuh_layer_id equal to 0.

The decoding order of a VVC subpicture item is determined by a VVC base item which is defined in subclause L.2.5.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
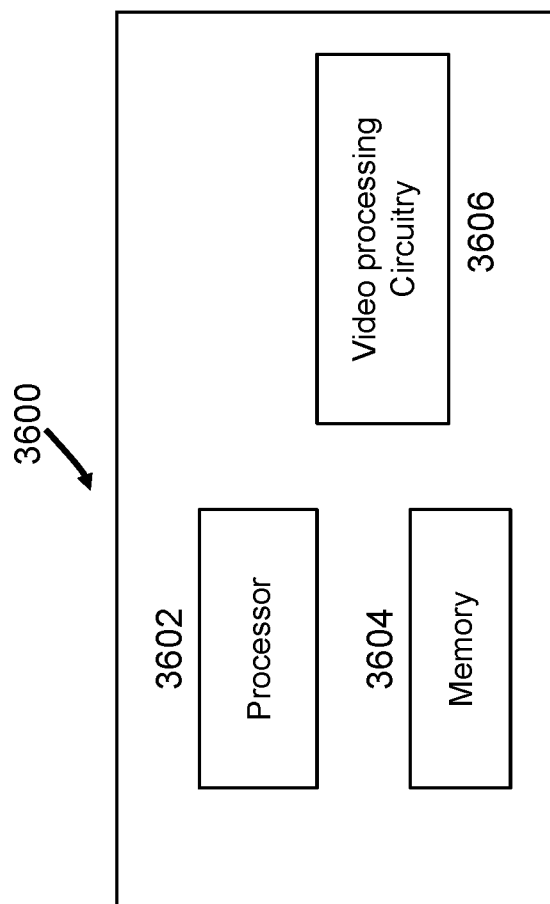
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
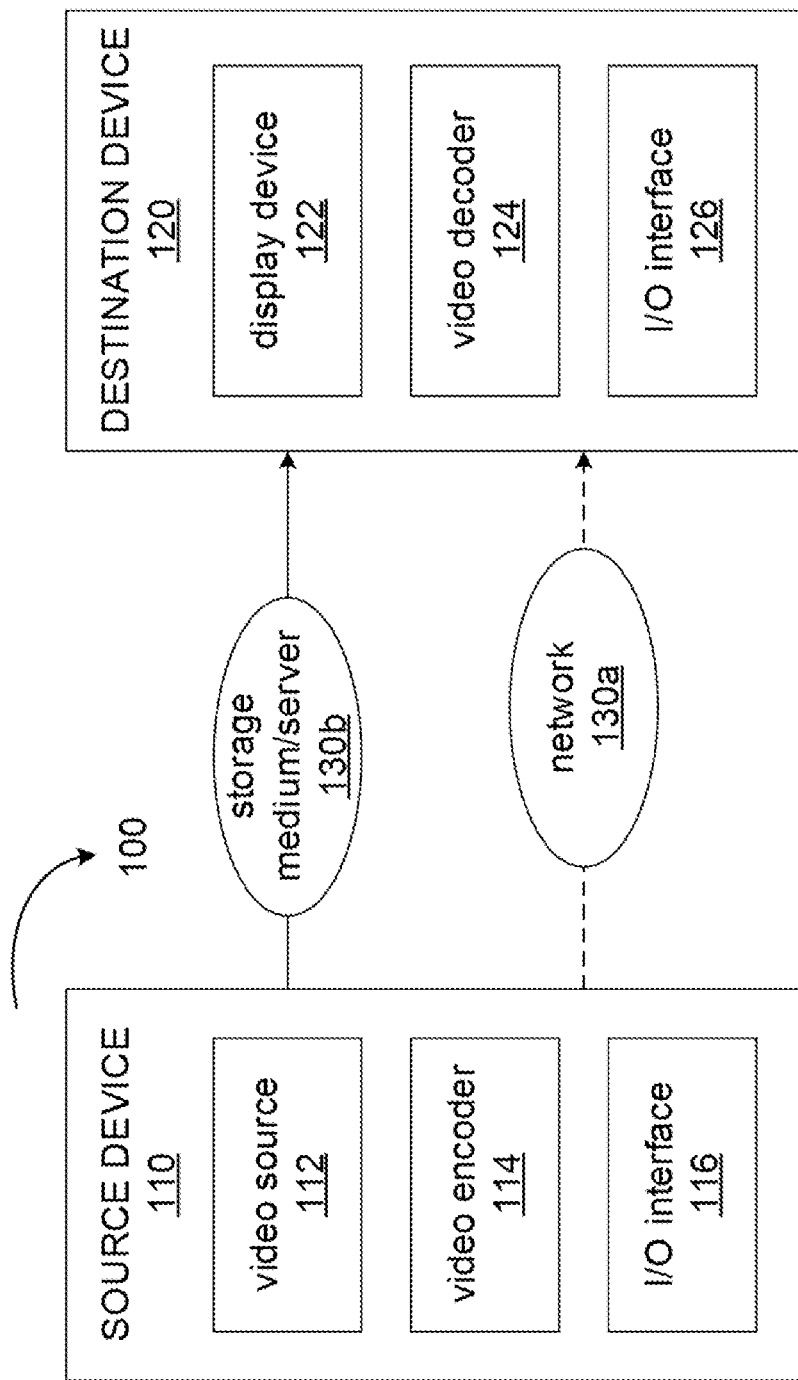
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
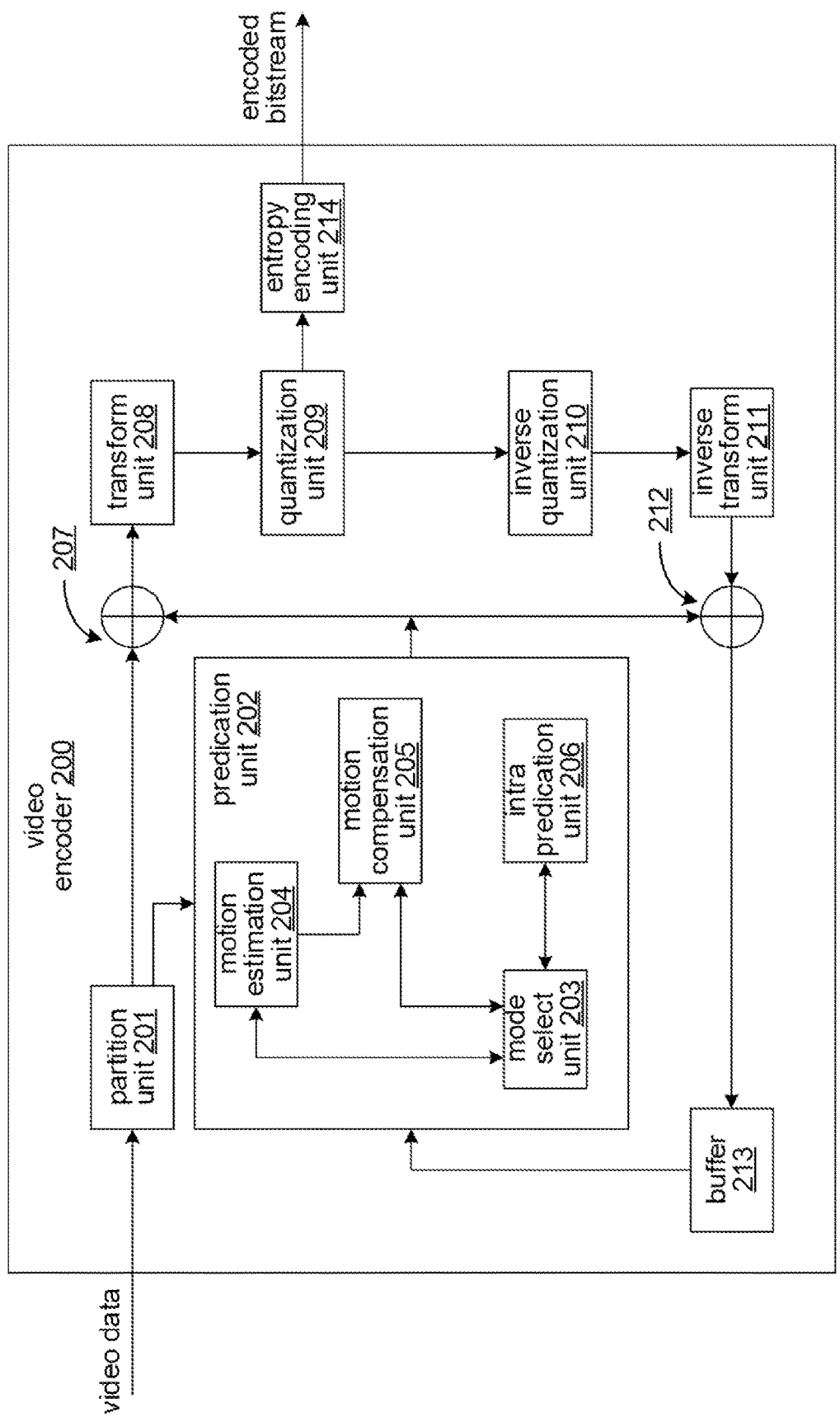
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
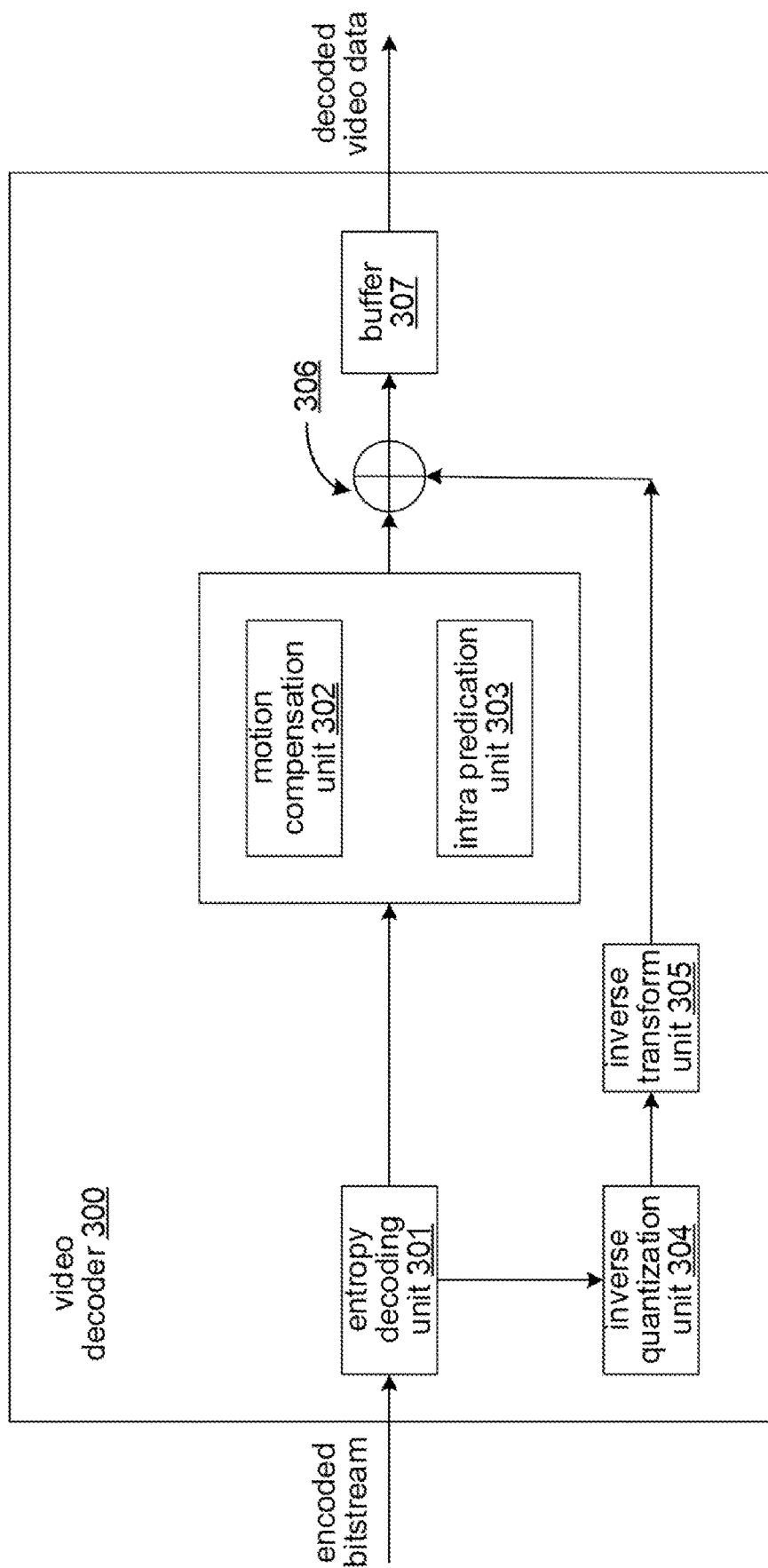
FIG. 6 is a block diagram that illustrates a decoder in accordance with some embodiments of the present disclosure.
Figure 7:
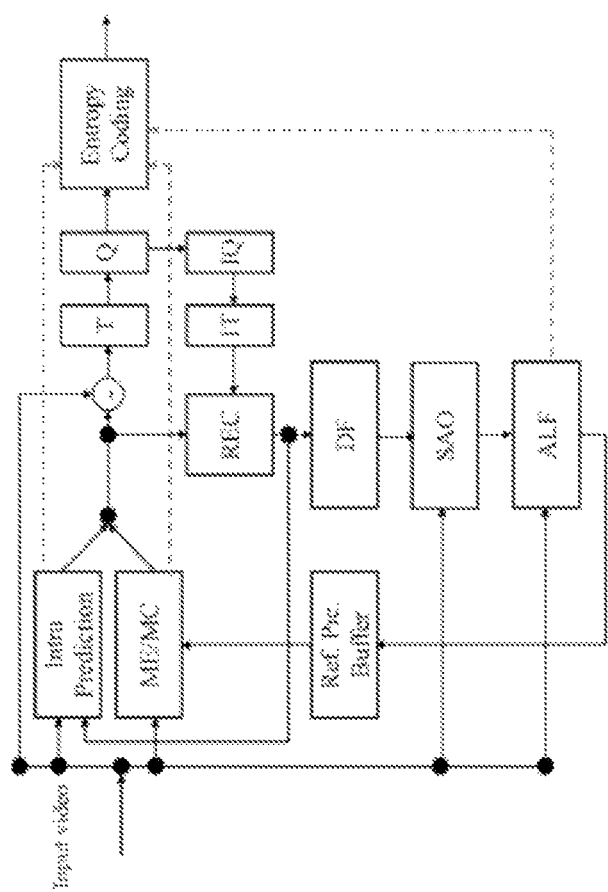
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., items 1, 10 and 11).

Figure 3:
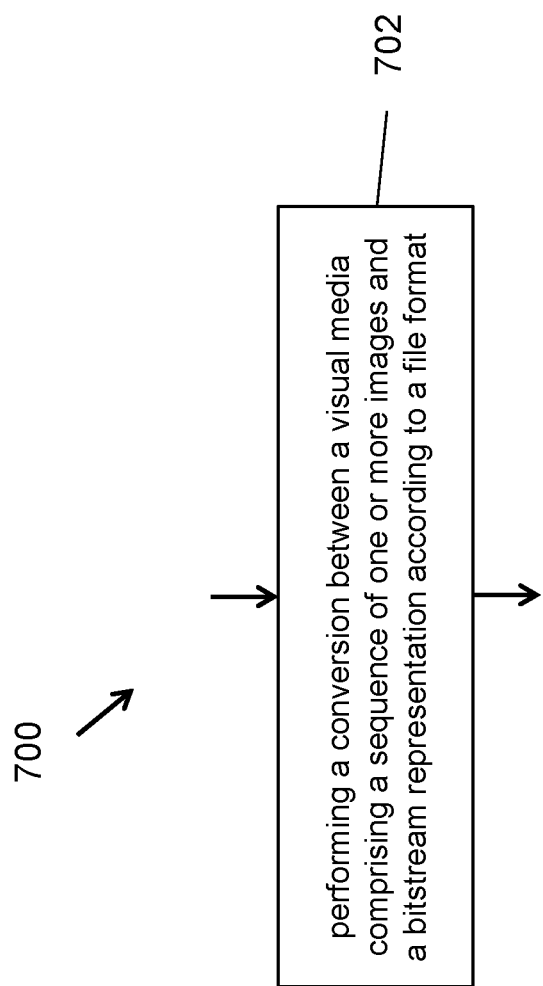
FIG. 3 is a flowchart for an example method of video processing.

1. A visual media processing method (e.g., method 700 depicted in FIG. 3), comprising: performing (702) a conversion between a visual media comprising a sequence of one or more images and a bitstream representation according to a file format; wherein the file format is configured to include one or more syntax element indicating a transition property between the one or more images during displaying of the one or more images.

2. The method of solution 1, wherein the transition property is a transition time, and wherein the file format includes another syntax element indicative of a type of the transition times, wherein the type comprises a mandatory transition time or a recommended transition time.

3. The method of solution 1, wherein the transition property comprises one or more transition effects between the one or more images.

4. The method of solution 2, wherein the file format includes one or more syntax elements for describing the one or more transition effects applicable to transitions between consecutive images or portions of the consecutive images.

5. The method of solution 3, wherein the file format includes a syntax structure that specifies multiple transition effects and corresponding portions of images to which the multiple transition effects are applicable during transition from one image to a next image.

The following solutions show example embodiments of techniques discussed in the previous section (e.g., item 2).

6. A visual media processing method, comprising: performing a conversion between a visual media comprising a sequence of one or more images and a bitstream representation according to a file format; wherein the file format specifies that, in case that the visual media is represented in a file having a specific file brand, the file format is restricted according a rule.

7. The method of solution 6, wherein the rule specifies to include only one access unit of a portion of an image that is coded using a particular coding tool.

8. The method of solution 6-7, wherein the particular coding tool comprises an intra coding tool.

9. The method of solution 6-7, wherein the particular coding tool comprises an intra block copy coding tool.

10. The method of solution 6, wherein the particular coding tool comprises a palette coding tool.

11. The method of solution 6, wherein the rule specifies that the file format is disallowed from storing the one or more images coded according to a coding property.

12. The method of solution 11, wherein the coding property comprises a target output layer set property.

The following solutions show example embodiments of techniques discussed in the previous section (e.g., items 3, 4, 5 and 8).

13. A visual media processing method, comprising: performing a conversion between a visual media comprising a sequence of one or more images and a bitstream representation according to a file format; wherein the file format is configured to indicate an image type for the one or more images according to a rule.

14. The method of solution 13, wherein the rule specifies that the file format further specifies that, for one image type, the file format allows inclusion of only one access unit that includes an intra coded image.

15. The method of solution 13, wherein the rule specifies that a particular image type is allowed to include only network abstraction layer units that contain exactly one access unit that is an intra random access picture unit.

16. The method of solution 13, wherein the rule specifies that for a particular image type the file format disallows containing pictures in layers that are from different target output layer sets.

17. The method of solution 13, wherein the rule specifies that the file format permits, for a particular image type, to include an entire access unit in which one or more pictures that include multiple extractable subpictures are included.

18. The method of any of solutions 1-17, wherein the conversion comprises encoding the one or more images to generate the bitstream representation according to the file format.

19. The method of solution 18, wherein the bitstream representation according to the file format is stored on a computer-readable medium or transmitted over a communication connection.

20. The method of any of solutions 1-17, wherein the conversion comprised decoding and reconstructing, from the bitstream representation, the one or more images.

21. The method of solution 20, further including facilitating displaying the one or more images after the decoding and reconstructing.

22. A video decoding apparatus comprising a processor configured to implement a method recited in one or more of solutions 1 to 21.

23. A video encoding apparatus comprising a processor configured to implement a method recited in one or more of solutions 1 to 21.

24. A computer program product having computer code stored thereon, the code, when executed by a processor, causes the processor to implement a method recited in any of solutions 1 to 21.

25. A computer readable medium on which a bitstream representation complying to a file format that is generated according to any of solutions 1 to 21.

26. A method, apparatus or system described in the present document.

Figure 8:
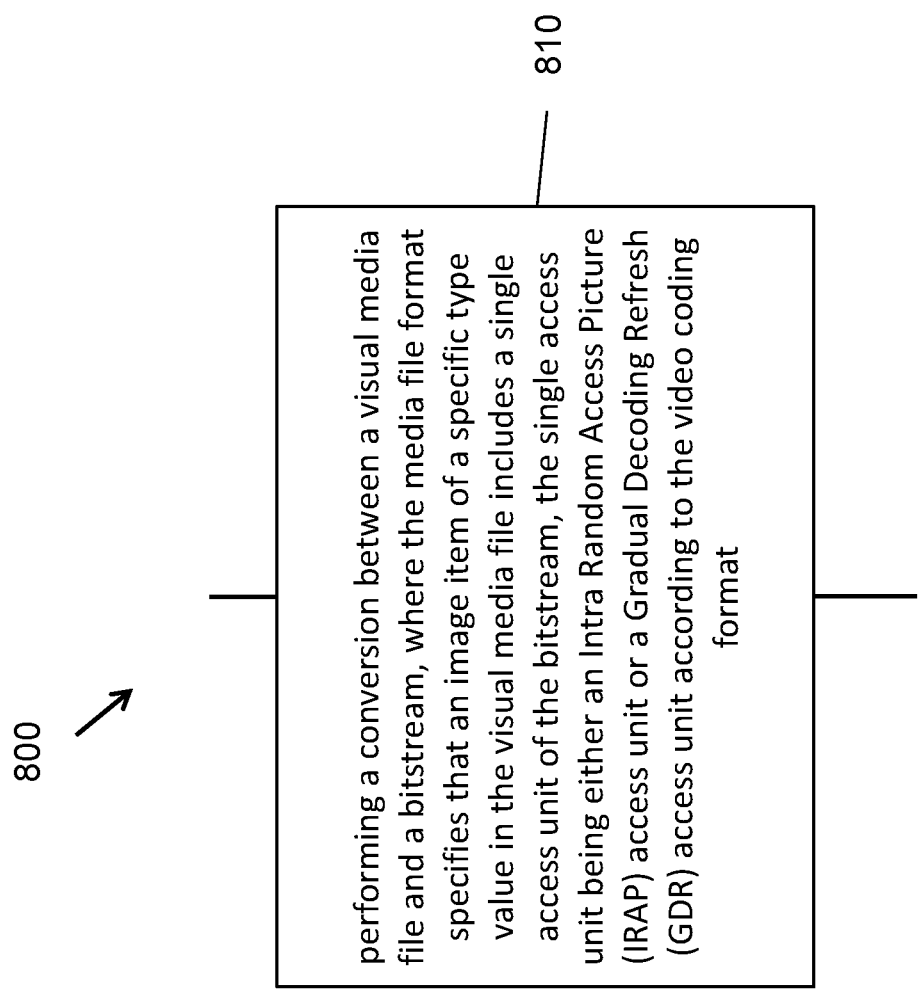
FIG. 8 is a flowchart representation for a method of processing image data in accordance with one or more embodiments of the present technology.

FIG. 8 is a flowchart representation for a method of processing image data in accordance with one or more embodiments of the present technology. The method 800 includes, at operation 810, performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file includes a single access unit of the bitstream. The single access unit is either an Intra Random Access Picture (IRAP) access unit according to the video coding format or a Gradual Decoding Refresh (GDR) access unit according to the video coding format. All pictures in the GDR access unit are identified as a recovery point in the bitstream.

Figure 9:
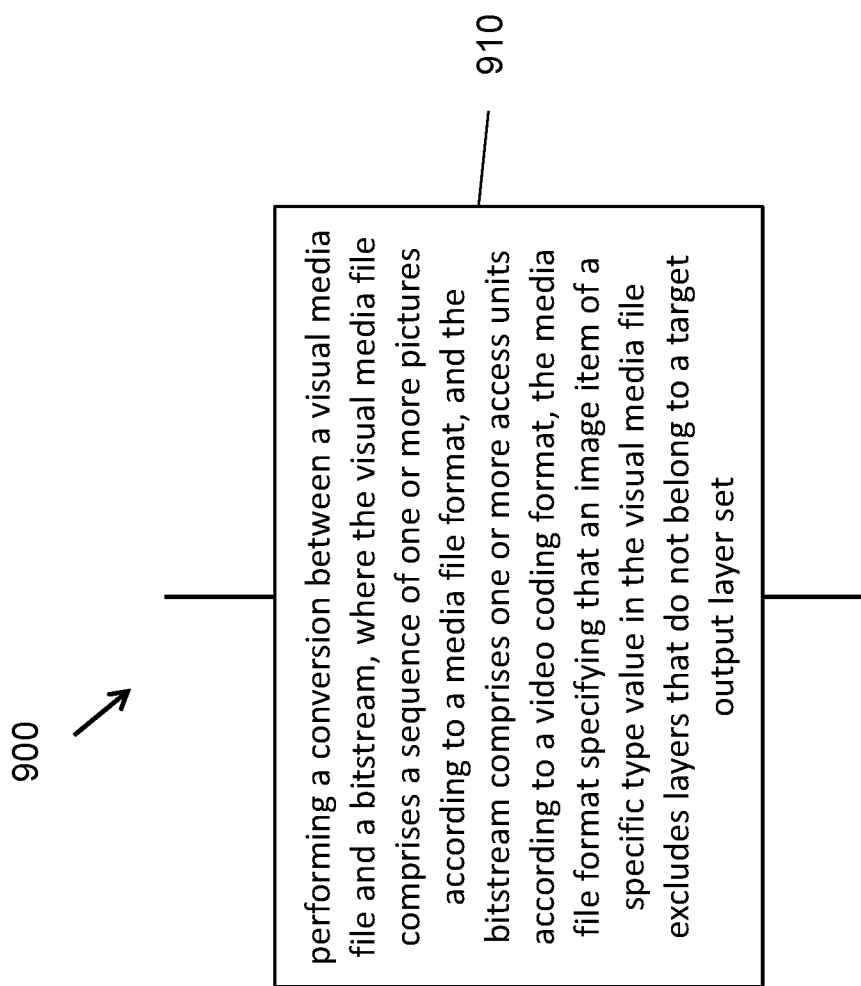
FIG. 9 is a flowchart representation for a method of processing image data in accordance with one or more embodiments of the present technology.

FIG. 9 is a flowchart representation for a method of processing image data in accordance with one or more embodiments of the present technology. The method 900 includes, at operation 910, performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file excludes layers that do not belong to a target output layer set.

Figure 10:
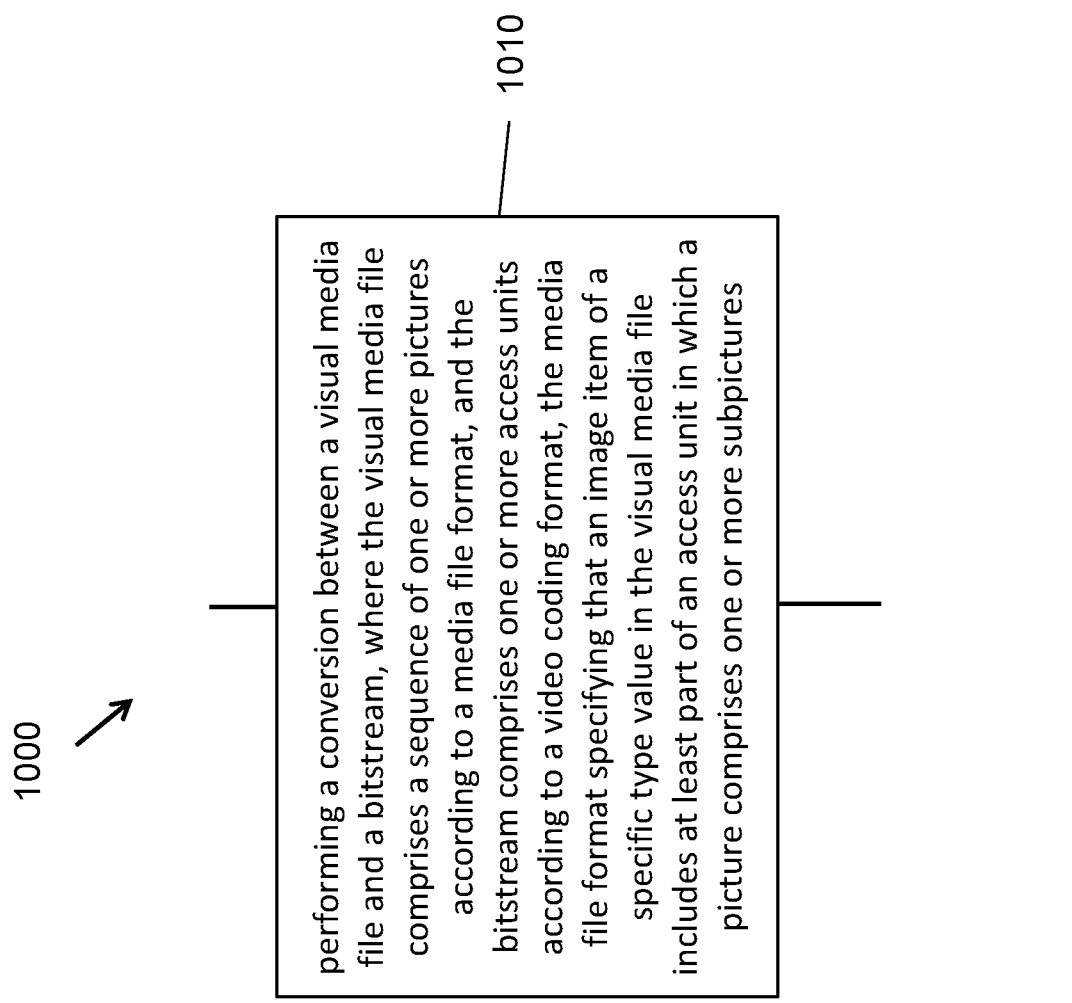
FIG. 10 is a flowchart representation for a method of processing image data in accordance with one or more embodiments of the present technology.

FIG. 10 is a flowchart representation for a method of processing image data in accordance with one or more embodiments of the present technology. The method 1000 includes, at operation 1010, performing a conversion between a visual media file and a bitstream. The visual media file comprises a sequence of one or more pictures according to a media file format, and the bitstream comprises one or more access units according to a video coding format. The bitstream is coded according to the video coding format. The media file format specifies that an image item of a specific type value in the visual media file includes at least part of an access unit in which a picture comprises one or more subpictures.

The following are examples of techniques discussed in connection with FIGS. 8-10.

1. An example method for processing video data, comprising: performing a conversion between a visual media file and a bitstream, wherein the visual media file comprises a sequence of one or more pictures according to a media file format, and wherein the bitstream comprises one or more access units according to a video coding format, wherein the bitstream is coded according to the video coding format, wherein the media file format specifies that an image item of a specific type value in the visual media file includes a single access unit of the bitstream, wherein the single access unit is either an Intra Random Access Picture (IRAP) access unit according to the video coding format or a Gradual Decoding Refresh (GDR) access unit according to the video coding format, and wherein all pictures in the GDR access unit are identified as a recovery point in the bitstream.

2. The method of example 1, wherein the video coding format corresponds to a Versatile Video Coding standard according to ISO/JEC 23090-3.

3. The method of claim 1 or 2, wherein the specific type value is specified as 'vvc1'.

4. The method of any of example 1 to 3, wherein each of the all pictures in the GDR access unit includes a picture header field having a value zero indicating that a corresponding picture is the recovery point.

5. The method of example 3, wherein the picture header field corresponds to a ph_recovery_poc_cnt field.

6. An example method for processing video data, comprising: performing a conversion between a visual media file and a bitstream, wherein the visual media file comprises a sequence of one or more pictures according to a media file format, and wherein the bitstream comprises one or more access units according to a video coding format, wherein the bitstream is coded according to the video coding format, and wherein the media file format specifies that an image item of a specific type value in the visual media file excludes layers that do not belong to a target output layer set.

7. The method of example 6, wherein the video coding format corresponds to a Versatile Video Coding standard according to ISO/JEC 23090-3.

8. The method of example 6 or 7, wherein the specific type value is specified as 'vvc1'.

9. The method of any of example 6 to 8, wherein the image item includes layers in an output layer set identified by a property indicating the target output layer set and does not include other layers.

10. A example method for processing video data, comprising: performing a conversion between a visual media file and a bitstream, wherein the visual media file comprises a sequence of one or more pictures according to a media file format, and wherein the bitstream comprises one or more access units according to a video coding format, wherein the bitstream is coded according to the video coding format, and wherein the media file format specifies that an image item of a specific type value in the visual media file includes at least part of an access unit in which a picture comprises one or more subpictures.

11. The method of example 10, wherein the video coding format corresponds to a Versatile Video Coding standard according to ISO/JEC 23090-3,and wherein the specific type value is specified as 'vvc1'.

12. The method of example 10 or 11, wherein the image item includes an entirety of the access unit.

13. The method of any of example 10 to 12, wherein the image item includes part of the access unit, and wherein, for each layer present in the bitstream, the one or more subpictures form a rectangular region.

14. A video processing apparatus comprising a processor, wherein the processor is configured to perform a method of any of example 1 to 13.

15. A non-transitory computer-readable recording medium storing a bitstream of a video which is generated by a method of any of example 1 to 13 performed by a video processing apparatus.

Figure 11:
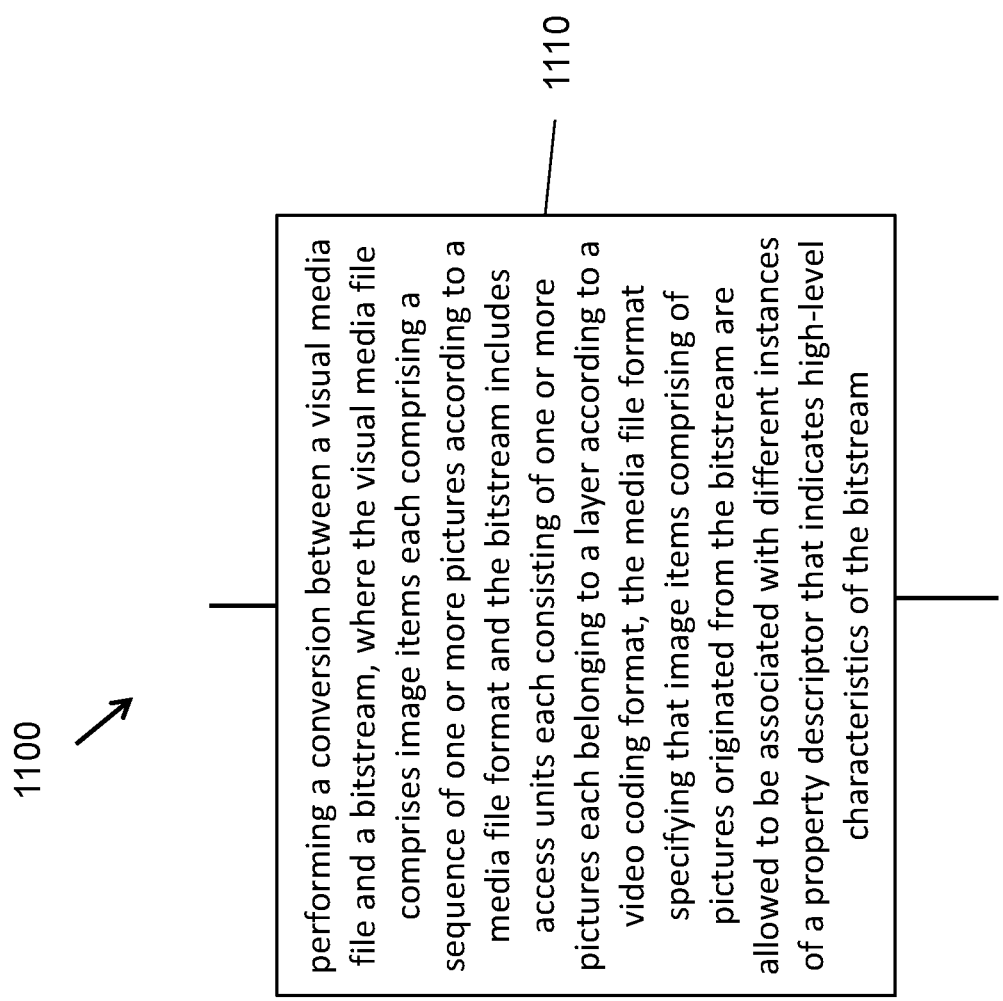
FIG. 11 is a flowchart representation for a method of processing image data in accordance with one or more embodiments of the present technology.

FIG. 11 is a flowchart representation for a method of processing image data in accordance with one or more embodiments of the present technology. The method 1100 includes, at operation 1110, performing a conversion between a visual media file and a bitstream. The visual media file comprises image items each comprising a sequence of one or more pictures according to a media file format. The bitstream includes access units each consisting of one or more pictures each belonging to a layer according to a video coding format. The media file format specifies that image items comprising of pictures originated from the bitstream are allowed to be associated with different instances of a property descriptor that indicates high-level characteristics of the bitstream.

Figure 12:
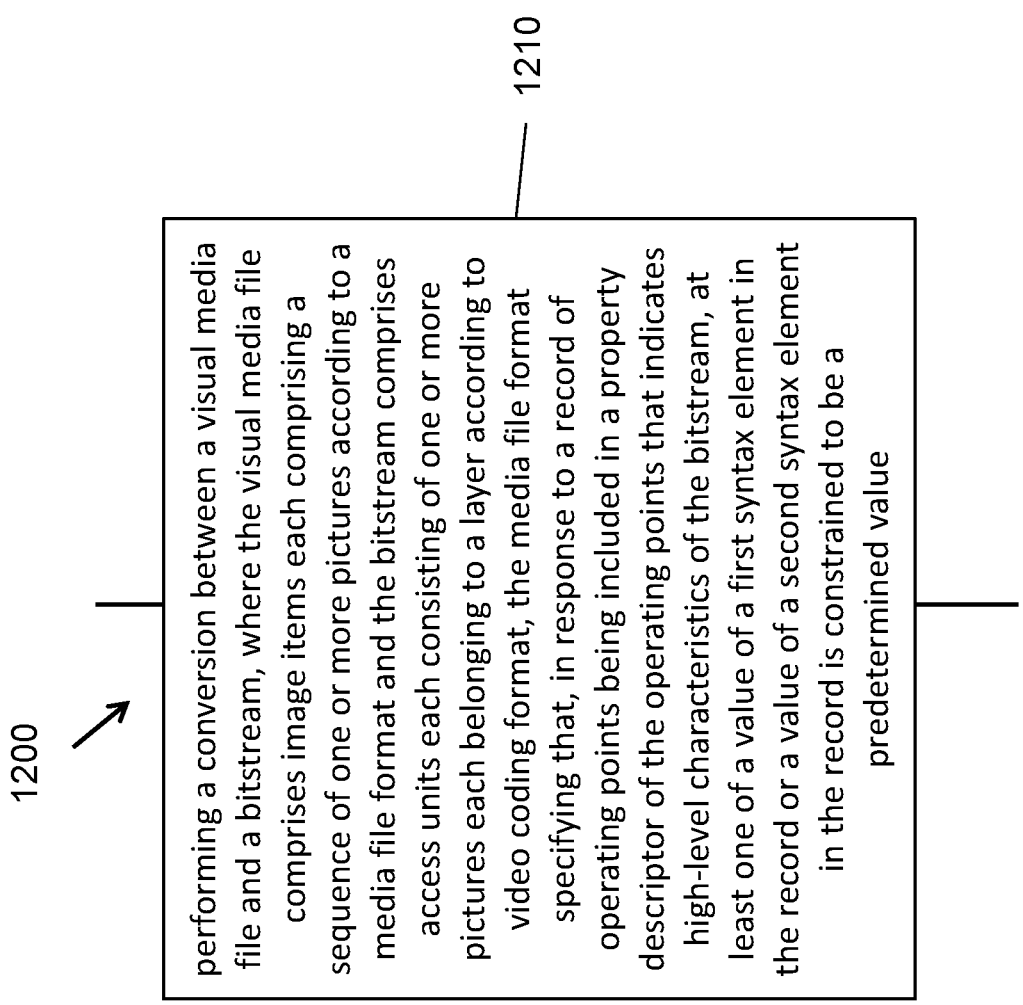
FIG. 12 is a flowchart representation for a method of processing image data in accordance with one or more embodiments of the present technology.

FIG. 12 is a flowchart representation for a method of processing image data in accordance with one or more embodiments of the present technology. The method 1200 includes, at operation 1210, performing a conversion between a visual media file and a bitstream. The visual media file comprises image items each comprising a sequence of one or more pictures according to a media file format. The bitstream comprises access units each consisting of one or more pictures each belonging to a layer according to video coding format. The media file format specifies that, in response to a record of operating points being included in a property descriptor of the operating points that indicates high-level characteristics of the bitstream, at least one of a value of a first syntax element in the record or a value of a second syntax element in the record is constrained to be a predetermined value.

The following are example solutions of techniques discussed in connection with FIGS. 11-12.

1. An example solution method for processing image data, comprising performing a conversion between a visual media file a bitstream, wherein the visual media file comprises image items each comprising a sequence of one or more pictures according to a media file format, and wherein the bitstream includes access units each consisting of one or more pictures each belonging to a layer according to a video coding format, wherein the media file format specifies that image items comprising pictures originated from the bitstream are allowed to be associated with different instances of a property descriptor that indicates high-level characteristics of the bitstream.

2. The method of example solution 1, wherein the video coding format corresponds to a Versatile Video Coding standard according to ISO/IEC 23090-3.

3. The method of example solution 1 or 2, wherein the property descriptor is represented as VvcOperatingPointsInformationProperty.

4. An example solution method for processing image data, comprising: performing a conversion between a visual media file and a bitstream, wherein the visual media file comprises image items each comprising a sequence of one or more pictures according to a media file format, and wherein the bitstream includes access units each consisting of one or more pictures each belonging to a layer according to a video coding format, wherein the media file format specifies that, in response to a record of operating points being included in a property descriptor of the operating points that indicates high-level characteristics of the bitstream, at least one of a value of a first syntax element in the record or a value of a second syntax element in the record is constrained to be a predetermined value.

5. The method of example solution 4, wherein the video coding format corresponds to a Versatile Video Coding standard according to ISO/IEC 23090-3.

6. The method of example solution 4 or 5, wherein the first syntax element specifies a maximum temporal identification associated with an i-th profile tier level syntax structure, i being in a range of 0 to (a number of profile tier levels—1).

7. The method of example solution 6, wherein the first syntax element is represented as ptl_max_temporal_id[i].

8. The method of any of example solution 4 to 7, wherein the second syntax element specifies a maximum temporal identification associated with the record of the operating points.

9. The method of example solution 8, wherein the second syntax element is represented as max_temproal_id.

10. The method of any of example solution 4 to 9, wherein the record includes a third syntax element specifying whether frame rate information is present, and wherein a value of the third syntax element is constrained to be the predetermined value.

11. The method of any of example solution 4 to 10, wherein the record includes a fourth syntax element specifying whether bit rate information is present, and wherein a value of the fourth syntax element is constrained to be the predetermined value.

12. The method of any of example solution 4 to 11, wherein the predetermined value is equal to 0.

13. A video processing apparatus comprising a processor, wherein the processor is configured to perform a method of any of example solution 1 to 12.

14. A non-transitory computer-readable recording medium storing a bitstream of a video which is generated by a method of any of example solution 1 to 12 performed by a video processing apparatus.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for processing image data, comprising:
performing a conversion between a visual media file and a bitstream, wherein the visual media file comprises a sequence of one or more pictures according to a media file format, and wherein the bitstream comprises one or more access units according to a video coding format, wherein the bitstream is coded according to the video coding format,
wherein the media file format specifies that an image item of a specific type value in the visual media file includes a single access unit, wherein the single access unit is allowed to be one of a single Intra Random Access Picture (IRAP) access unit according to the video coding format and a single Gradual Decoding Refresh (GDR) access unit according to the video coding format, and wherein all pictures in the GDR access unit are identified as a recovery point in the bitstream;
wherein the media file format specifies that an image item of a specific type value in the visual media file excludes layers that do not belong to a target output layer set; and
wherein the media file format further specifies that, in response to a record of operating points being included in a property descriptor of the operating points that indicates high-level characteristics of the bitstream, a value of a first syntax element ptl_max_temporal_id in the record and a value of a second syntax element max_temporal_id in the record are constrained to be equal to zero, wherein the first syntax element indicates a maximum temporal identification of layer representation for a specified profile, tier, and level structure, and wherein the second syntax element indicates a maximum temporal identification for an operating point.

2. The method of claim 1, wherein the video coding format corresponds to a Versatile Video Coding standard according to ISO/IEC 23090-3, and wherein the specific type value is specified as 'vvc1'.

3. The method of claim 1, wherein each of the all pictures in the GDR access unit includes a picture header field having a value zero indicating that a corresponding picture is the recovery point.

4. The method of claim 3, wherein the picture header field corresponds to a ph_recovery_poc_cnt field.

5. The method of claim 1, wherein the image item includes layers in an output layer set identified by a property indicating the target output layer set and does not include other layers.

6. The method of claim 1, wherein the media file format specifies that an image item of a specific type value in the visual media file includes at least part of an access unit in which a picture comprises one or more subpictures.

7. The method of claim 6, wherein the image item includes an entirety of the access unit.

8. The method of claim 6, wherein the image item includes part of the access unit, and wherein, for each layer present in the bitstream, the one or more subpictures form a rectangular region.

9. The method of claim 1, wherein the conversion includes encoding the visual media file into the bitstream.

10. The method of claim 1, wherein the conversion includes decoding the visual media file from the bitstream.

11. An apparatus for processing visual media file data comprising a processor and a non-transitory memory with instructions thereon, wherein the instructions upon execution by the processor, cause the processor to:
perform a conversion between a visual media file and a bitstream, wherein the visual media file comprises a sequence of one or more pictures according to a media file format, and wherein the bitstream comprises one or more access units according to a video coding format, wherein the bitstream is coded according to the video coding format,
wherein the media file format specifies that an image item of a specific type value in the visual media file includes a single access unit, wherein the single access unit is allowed to be one of a single Intra Random Access Picture (IRAP) access unit according to the video coding format and a single Gradual Decoding Refresh (GDR) access unit according to the video coding format, and wherein all pictures in the GDR access unit are identified as a recovery point in the bitstream;

wherein the media file format specifies that an image item of a specific type value in the visual media file excludes layers that do not belong to a target output layer set; and
wherein the media file format further specifies that, in response to a record of operating points being included in a property descriptor of the operating points that indicates high-level characteristics of the bitstream, a value of a first syntax element ptl_max_temporal_id in the record and a value of a second syntax element max_temporal_id in the record are constrained to be equal to zero, wherein the first syntax element indicates a maximum temporal identification of layer representation for a specified profile, tier, and level structure, and wherein the second syntax element indicates a maximum temporal identification for an operating point.

12. The apparatus of claim 11, wherein the video coding format corresponds to a Versatile Video Coding standard according to ISO/IEC 23090-3, and wherein the specific type value is specified as 'vvc1'.

13. The apparatus of claim 11, wherein each of the all pictures in the GDR access unit includes a picture header field having a value zero indicating that a corresponding picture is the recovery point, and wherein the picture header field corresponds to a ph_recovery_poc_cnt field.

14. The apparatus of claim 11, wherein the media file format specifies that the image item of the specific type value in the visual media file includes layers in an output layer set identified by a property indicating the target output layer set and does not include other layers.

15. The apparatus of claim 11, wherein the media file format specifies that an image item of a specific type value in the visual media file includes at least part of an access unit in which a picture comprises one or more subpictures.

16. The apparatus of claim 15, wherein the image item includes an entirety of the access unit.

17. The apparatus of claim 15, wherein the image item includes part of the access unit, and wherein, for each layer present in the bitstream, the one or more subpictures form a rectangular region.

18. A non-transitory computer-readable storage medium storing instructions that cause a processor to:
perform a conversion between a visual media file and a bitstream, wherein the visual media file comprises a sequence of one or more pictures according to a media file format, and wherein the bitstream comprises one or more access units according to a video coding format,
wherein the bitstream is coded according to the video coding format,
wherein the media file format specifies that an image item of a specific type value in the visual media file includes a single access unit, wherein the single access unit is allowed to be one of a single Intra Random Access Picture (IRAP) access unit according to the video coding format and a single Gradual Decoding Refresh (GDR) access unit according to the video coding format, and wherein all pictures in the GDR access unit are identified as a recovery point in the bitstream;
wherein the media file format specifies that an image item of a specific type value in the visual media file excludes layers that do not belong to a target output layer set; and
wherein the media file format further specifies that, in response to a record of operating points being included in a property descriptor of the operating points that indicates high-level characteristics of the bitstream, a value of a first syntax element ptl_max_temporal_id in the record and a value of a second syntax element max_temporal_id in the record are constrained to be equal to zero, wherein the first syntax element indicates a maximum temporal identification of layer representation for a specified profile, tier, and level structure, and wherein the second syntax element indicates a maximum temporal identification for an operating point.

19. The non-transitory computer-readable storage medium of claim 18, wherein each of the all pictures in the GDR access unit includes a picture header field having a value zero indicating that a corresponding picture is the recovery point, and wherein the picture header field corresponds to a ph_recovery_poc_cnt field.

20. A non-transitory computer-readable recording medium storing a bitstream of a video which is generated by a method performed by a video processing apparatus, wherein the method comprises:
generating a visual media file from the bitstream of the video,
wherein the visual media file comprises a sequence of one or more pictures according to a media file format, and wherein the bitstream comprises one or more access units according to a video coding format,
wherein the bitstream is coded according to the video coding format,
wherein the media file format specifies that an image item of a specific type value in the visual media file includes a single access unit, wherein the single access unit is allowed to be one of a single Intra Random Access Picture (IRAP) access unit according to the video coding format and a single Gradual Decoding Refresh (GDR) access unit according to the video coding format, and wherein all pictures in the GDR access unit are identified as a recovery point in the bitstream;
wherein the media file format specifies that an image item of a specific type value in the visual media file excludes layers that do not belong to a target output layer set; and
wherein the media file format further specifies that, in response to a record of operating points being included in a property descriptor of the operating points that indicates high-level characteristics of the bitstream, a value of a first syntax element ptl_max_temporal_id in the record and a value of a second syntax element max_temporal_id in the record are constrained to be equal to zero, wherein the first syntax element indicates a maximum temporal identification of layer representation for a specified profile, tier, and level structure, and wherein the second syntax element indicates a maximum temporal identification for an operating point.

* * * * *